United States Patent
Wong et al.

(10) Patent No.: US 6,496,182 B1
(45) Date of Patent: Dec. 17, 2002

(54) METHOD AND SYSTEM FOR PROVIDING TOUCH-SENSITIVE SCREENS FOR THE VISUALLY IMPAIRED

(75) Inventors: Peter Kam-Ho Wong, Mercer Island, WA (US); Jeffrey B. Reifman, Seattle, WA (US); Gregory C. Lowney, Redmond, WA (US); Shawn J. Cokus, Syracuse, NY (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/481,226

(22) Filed: Jun. 7, 1995

(51) Int. Cl.⁷ .................................................. G09G 5/00
(52) U.S. Cl. ...................................................... 345/173
(58) Field of Search ................................ 345/173, 123, 345/830; 178/18

(56) References Cited

U.S. PATENT DOCUMENTS

| | | | | |
|---|---|---|---|---|
| 5,327,160 A | * | 7/1994 | Asher ........................ | 345/173 |
| 5,390,005 A | * | 2/1995 | Kimoto et al. .............. | 345/173 |
| 5,485,176 A | * | 1/1996 | Ohara et al. ................ | 345/173 |
| 5,545,857 A | * | 8/1996 | Lee et al. .................... | 345/173 |
| 5,552,806 A | * | 9/1996 | Lenchik ...................... | 345/173 |
| 5,589,855 A | * | 12/1996 | Blumstein et al. | |
| 5,614,993 A | * | 3/1997 | Smmith et al. ............. | 345/173 |

OTHER PUBLICATIONS

Barthel, Matt, "National City Corp.'s Kentucky Bank Installs Talking Computers for Blind," *American Banker* CLVIII(86), May 6, 1993.

Klett, Stephen P., Jr. "Talking Windows," *Computerworld* 27(23):89, Jun. 7, 1993.

* cited by examiner

Primary Examiner—Armare Mengistu
(74) *Attorney, Agent, or Firm*—Christensen O'Connor Johnson Kindness PLLC

(57) ABSTRACT

A method and system for enabling a visually impaired user to use a touch-sensitive device. The present invention provides an interface for the visually impaired (IVI) system which enables a visually impaired user to use a touch-sensitive screen. The IVI system provides an explore mode in which a visually impaired user may determine which objects are on the touch-sensitive screen by dragging a finger over the touch-sensitive screen. In particular, the IVI system announces objects as a user touches them. For example, the IVI system announces text as it is touched and announces controls, such as buttons, as they are touched. In addition, the IVI system enables a user to execute controls. A user may execute a control, such as a button, by dragging a finger onto the control, and then, without dragging the finger off of the control, lifting the finger off of the touch-sensitive screen. The IVI system further enables a user to scroll through lists on a touch-sensitive screen. In particular, the IVI system enables a user to use a scroll thumb to scroll through a list. When a user drags a finger over the scroll thumb, and then, without dragging the finger off of the scroll thumb, lifts the finger off of the touch-sensitive screen, the IVI system enters scroll mode. In the scroll mode, a user may drag a finger anywhere on the touch-sensitive screen to scroll the list. While in scroll mode if a user again lifts their finger off of the touch-sensitive screen, the IVI system returns to explore mode.

26 Claims, 12 Drawing Sheets

[process other messages]

METHOD AND SYSTEM FOR PROVIDING TOUCH-SENSITIVE SCREENS FOR THE VISUALLY IMPAIRED

TECHNICAL FIELD

This invention relates generally to a method and system for using touch-sensitive screens, and more specifically, for enabling visually impaired users to use touch-sensitive screens to control various devices.

BACKGROUND OF THE INVENTION

The modern workplace has become increasingly dependent on electronic devices, such as copy and facsimile machines. Many of these devices have embedded computers to control the functioning of the electronic device. These computers often utilize touch-sensitive screens to input and output information.

A touch-sensitive screen is a display device through which a computer can, in addition to displaying information, receive information by sensing a user's touch on the touch-sensitive screen. The computer generally displays various objects, such as an icon or a control, on the touch-sensitive screen. These objects typically represent the state of the electronic device and commands that can be performed by the electronic device. For example, an icon representing a selected file may indicate that the file is currently selected to be transmitted by a facsimile machine, and a button, which is a type of control, may represent the command to start sending a document. A user selects an object by touching the displayed object typically with a finger. The computer determines which object is selected by determining which object is displayed at the location the user touched. By selecting an object, the user indicates to the computer that an associated command should be performed. For example, when a "start" button is selected by a user, then a document is sent and when an item in a list is selected, then the item may be highlighted.

FIG. 1 illustrates a conventional touch-sensitive screen 101 for a copy machine. The touch-sensitive screen displays a message area 104 that displays instructions for operation of the device, such as instructing the user to "Enter Number of Copies." The touch-sensitive screen displays a text box 114 which displays the number of copies to be made. The touch-sensitive screen also displays several controls. The controls shown are buttons 106, 108, 110, and 112, and input controls 116 of the numeric pad. Each of the buttons represents a command to be performed by the copy machine. For example, when a user selects the "Clear Number of Copies" button 106, then the copy machine enters zeroes into the text box 104. Also, when the user selects the "start" button 108, then the copy machine starts copying.

An electronic device may also display a list box on a touch-sensitive screen. FIG. 2 illustrates a sample list box. A list box allows a user to view a list consisting of list items. If the list contains more list items than can be displayed in the list box at one time, then the user can "scroll" through the list using a scroll bar. A user controls scrolling by touching the scroll bar and controls selecting a list item by touching the list item. For example, the list in FIG. 2 contains the list items "Paper Tray Selection" 202 and "Enlargement Selection" 204. By touching the list item "Paper Tray Selection," the user selects this list item. Typically, the list item is then highlighted to provide a visual cue to the user that the list item has been selected. A user may deselect the list item by touching the list item again. A user scrolls through the list by using the scroll bar 212. The scroll bar has a scroll up arrow 206, a scroll down arrow 208, and a scroll thumb 210 (which is also called a scroll box). When a user touches the scroll up arrow, the list typically scrolls up one list item, and when a user touches the scroll down arrow, the list typically scrolls down one list item. In addition, a user may touch the scroll thumb, and while maintaining contact with the touch-sensitive screen, slide the scroll thumb along the scroll bar to scroll through the list. If the user does not maintain contact with the scroll thumb, then scrolling stops.

Because a user needs to see a touch-sensitive screen to use it, conventional touch-sensitive screens on electronic devices make the devices virtually inaccessible for visually impaired users. A touch-sensitive screen displays text, which a visually impaired user may not be able to read. In addition, the flat touch-sensitive screen has no physically raised buttons for a visually impaired user to feel. Instead, touch-sensitive screens utilize a graphical symbol to represent a button, so a visually impaired user may not be able to find buttons on a touch-sensitive screen. In addition, a visually impaired user has difficulty selecting list items or scrolling through the list. Using the scroll bar is especially difficult because it requires the user to not only find the scroll thumb but also maintain contact with the scroll thumb to scroll a list, which the visually impaired user may not even be able to see.

Also, many touch-sensitive screens display text and graphical symbols in low contrast relative to the background color of the touch-sensitive screen which makes the use of a touch-sensitive screen challenging even to users who have limited sight. Moreover, different devices typically display text, icons and controls at different locations on their touch-sensitive screens. For instance, one device may place buttons at the top of the touch-sensitive screen and another may place them at the right side of the touch-sensitive screen. Because of the number and variety of these differences, it is not easy for a user who is visually impaired to memorize these differences and thus use these devices. In addition, a single-touch sensitive screen typically displays different text and graphical symbols depending on context, which makes it difficult for a user who is visually impaired to memorize the differences even on a single touch-sensitive screen.

The community of visually impaired users is large, including users who may have limited vision as well as users who have lost all vision. Because of widespread use of touch-sensitive screens on electronic devices in the workplace, visually impaired users are finding it increasingly difficult to find or maintain employment in positions that require use of these electronic devices. In addition, the use of touch-sensitive screens has expanded into areas outside the workplace. For example, touch-sensitive screens are used on microwave ovens and in computerized information guides at airports. As the use of touch-sensitive screens increases, visually impaired users find more devices to be inaccessible to them.

SUMMARY OF THE INVENTION

It is an object of the present invention to enable a visually impaired user to explore the objects on a touch-sensitive screen.

It is another object of the present invention to enable a visually impaired user to select controls displayed on a touch-sensitive screen.

It is yet another object of the present invention to enable a visually impaired user to scroll through lists on a touch-sensitive screen by sliding a scroll thumb.

These and other objects, which will become apparent as the invention is more fully described below, are obtained by the interface for the visually impaired (IVI) system. In a preferred embodiment, the IVI system provides a method for selecting a control region that is displayed on a touch-sensitive screen. The touch-sensitive screen has regions, including control regions. Each control region is associated with a command. The IVI system determines whether a user is contacting the touch-sensitive screen over a control region. When the user is contacting the touch-sensitive screen over a control region, the IVI system determines whether the user has terminated contact with the touch-sensitive panel without contacting the touch-sensitive screen outside of the control region. When the user has terminated contact with the touch-sensitive screen, the IVI system selects the control region and performs the command. The IVI system uses a similar method for selecting items in a list.

Another aspect of a preferred embodiment of the IVI system provides a method of scrolling through a list of list items. The IVI system defines a scroll bar region with a scroll box for a touch-sensitive screen. The IVI system determines whether the user is contacting the scroll box. If the user is contacting the scroll box, the IVI system determines the initial position of the scroll box. Then, the IVI system determines whether the user, without contacting the touch-sensitive screen outside of the scroll box, subsequently terminates contact with the touch-sensitive screen. When the user terminates contact with the touch-sensitive screen in such a manner, the IVI system enters a scroll mode. When the user again touches the touch-sensitive screen, the IVI system then scrolls the list based on position of contact with the touch-sensitive screen. In addition, in a preferred embodiment, the IVI system provides audio feedback as to what object a user is touching and as to the number of list items that have been scrolled.

DETAILED DESCRIPTION OF THE INVENTION

Figure 1:
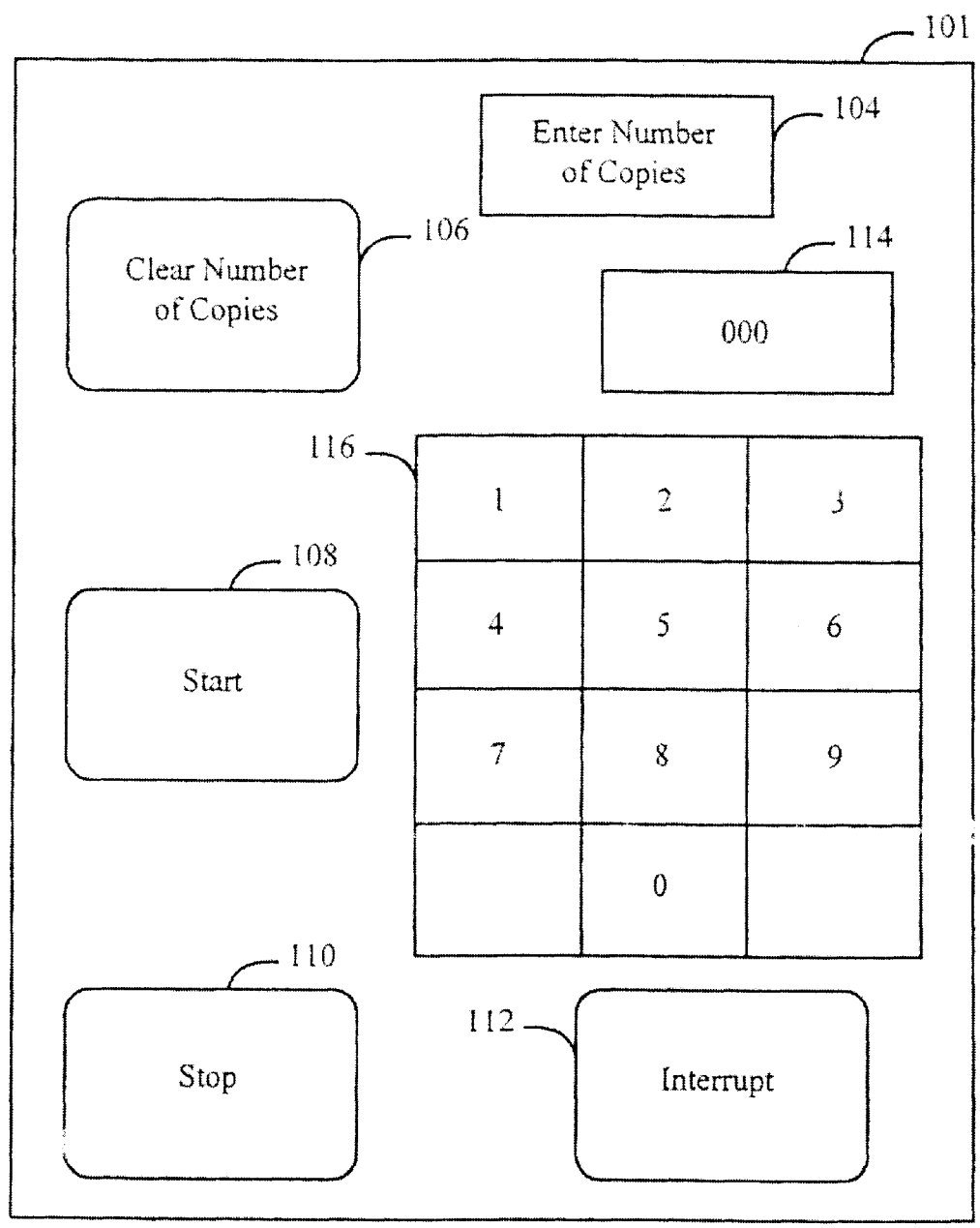
FIG. 1 illustrates a touch-sensitive screen for a copy machine.
Figure 2:
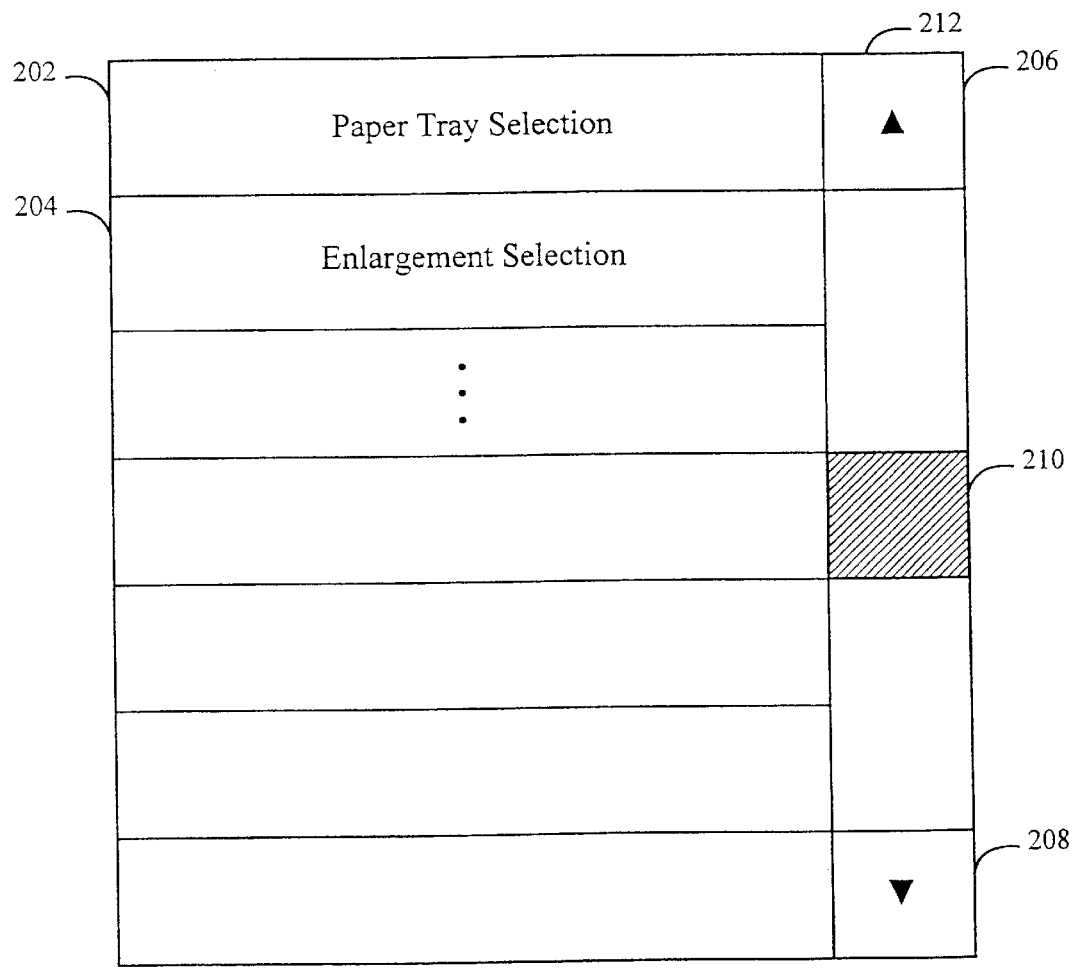
FIG. 2 illustrates a sample list box.

The present invention provides a method and system for enabling a visually impaired user to use a touch-sensitive screen in an effective manner. The touch-sensitive screen contains visual cues which enable a user who is not visually impaired to use the device. The interface for the visually impaired (IVI) system in a preferred embodiment provides audio feedback to a user of a touch-sensitive screen to enable a visually impaired user to use the touch-sensitive screen. In an explore mode of the IVI system, a visually impaired user may determine which objects are displayed on the touch-sensitive screen by touching the touch-sensitive screen with a finger and then dragging the finger over the touch-sensitive screen. As the visually impaired user touches an object while dragging the finger, the IVI system announces text associated with the touched object. For example, if the visually impaired user touches a message area on the touch-sensitive screen, the IVI system announces the text associated with that message area. In addition, if the visually impaired user touches a button, the IVI system announces the text associated with the button. The IVI system also announces an indication that the user has started or stopped touching a particular control. That is, when a user drags their finger into an area on the touch sensitive screen where a control is displayed, the IVI system announces that the user is touching the control. When the user then drags their finger out of the area, the IVI system announces that the user is no longer touching the control. In this way, a user knows when a control (e.g., button) is being touched. A user selects a button by touching the button and then lifting their finger off the touched button. A command associated with the button is typically performed when the button is selected.

The IVI system also enables a visually impaired user to scroll through a list using a scroll bar. A scroll bar contains a scroll thumb, and by sliding the scroll thumb along the scroll bar, a user may scroll through a list. In particular, when a user touches the scroll bar, the IVI system announces that the user is touching the scroll bar. When a user touches the scroll thumb, the IVI system announces that the user is touching the scroll thumb. A user instructs the IVI system to enter a scroll mode by touching the scroll thumb and, without dragging their finger off of the scroll thumb, lifting their finger off of the scroll thumb. The scroll mode is then entered. In scroll mode, a user scrolls through a list by sliding the scroll thumb along the scroll bar. Because a visually impaired user may not be able to see the scroll bar, the IVI system, while in scroll mode, allows a user to drag their finger anywhere on the touch-sensitive screen. The IVI system interprets the user's finger position to correspond to a vertical position on the scroll bar and scrolls the list accordingly. The IVI system periodically announces how many lines have been scrolled. A user lifts their finger off the touch-sensitive screen to exit scroll mode. When the user again touches the touch-sensitive screen, the IVI system re-enters explore mode.

Figure 3:
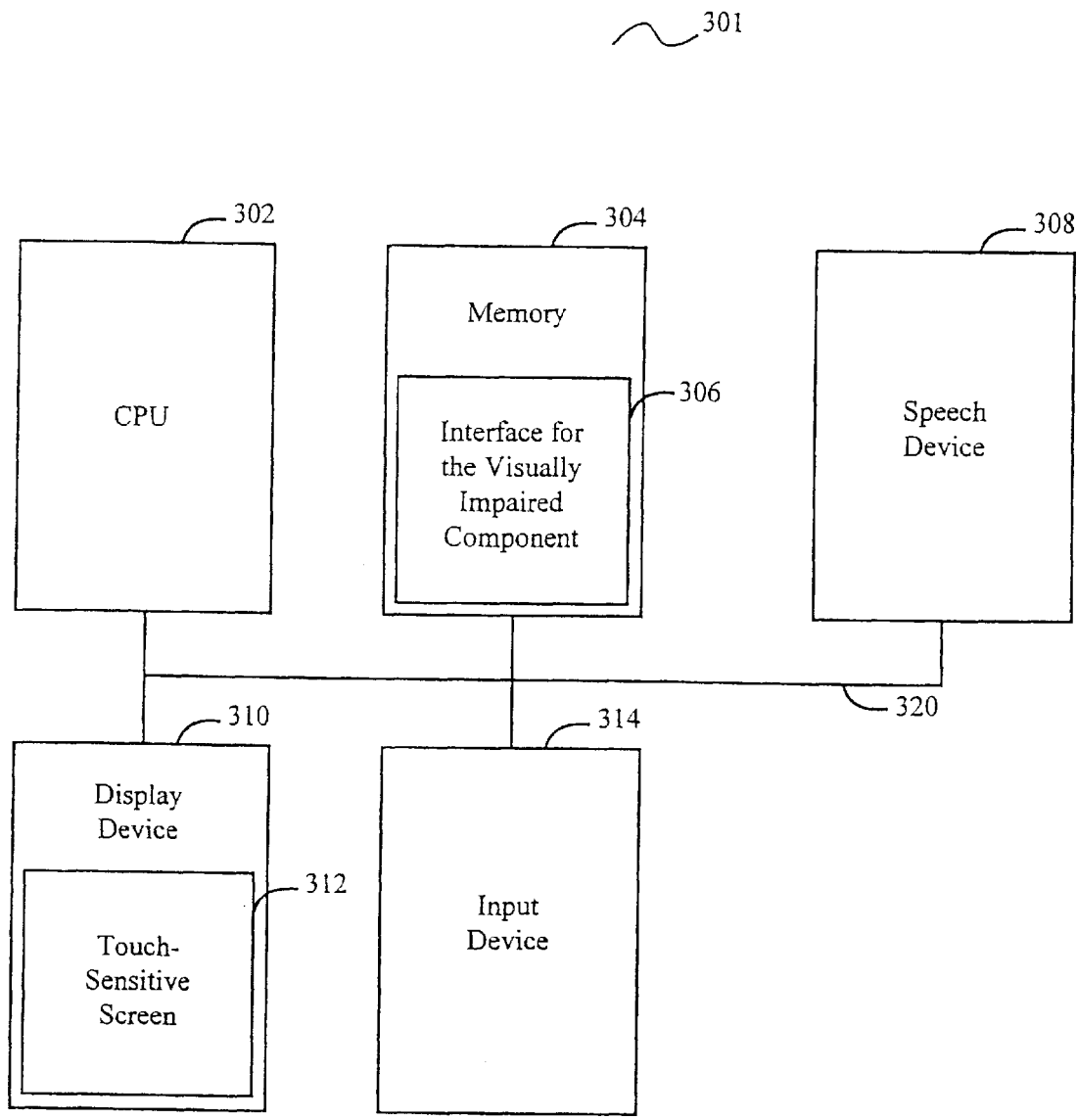
FIG. 3 illustrates an overview block diagram of an apparatus for using a touch-sensitive screen in a preferred embodiment of the present invention.

FIG. 3 illustrates an overview block diagram of an apparatus for using a touch-sensitive screen in a preferred embodiment of the present invention. The computer system 301 contains a CPU 302 and a memory 304. The memory contains an interface for the visually impaired (IVI) component 306. The computer system also contains a display device 310, which utilizes a touch-sensitive screen 312. The computer system also optionally includes an input device 314, such as a keyboard. A bus 320 connects the components of the computer system. The IVI component may receive input either through the touch-sensitive screen or through an input device. The IVI component provides audio output using the speech device. In particular, when a user touches the touch-sensitive screen, the IVI component receives input from the touch-sensitive screen indicating the user's finger position on the touch-sensitive screen in X,Y coordinates. When a user is no longer touching the touch-sensitive screen, the IVI component receives input indicating that the user is no longer touching the touch-sensitive screen. Based on input of the finger's position on the touch-sensitive screen or input indicating the finger is no longer touching the touch-sensitive screen, the IVI component determines whether the user has started touching an object. If the user has started touching an object, the IVI component provides audio feedback of the text associated with the object using the speech device. Furthermore, if the IVI component determines that the input indicates selecting an object, the IVI component indicates the selection by an announcement. Also, based on the input, the IVI component determines whether to enter explore mode or scroll mode and announces which mode it is entering.

Figure 4:
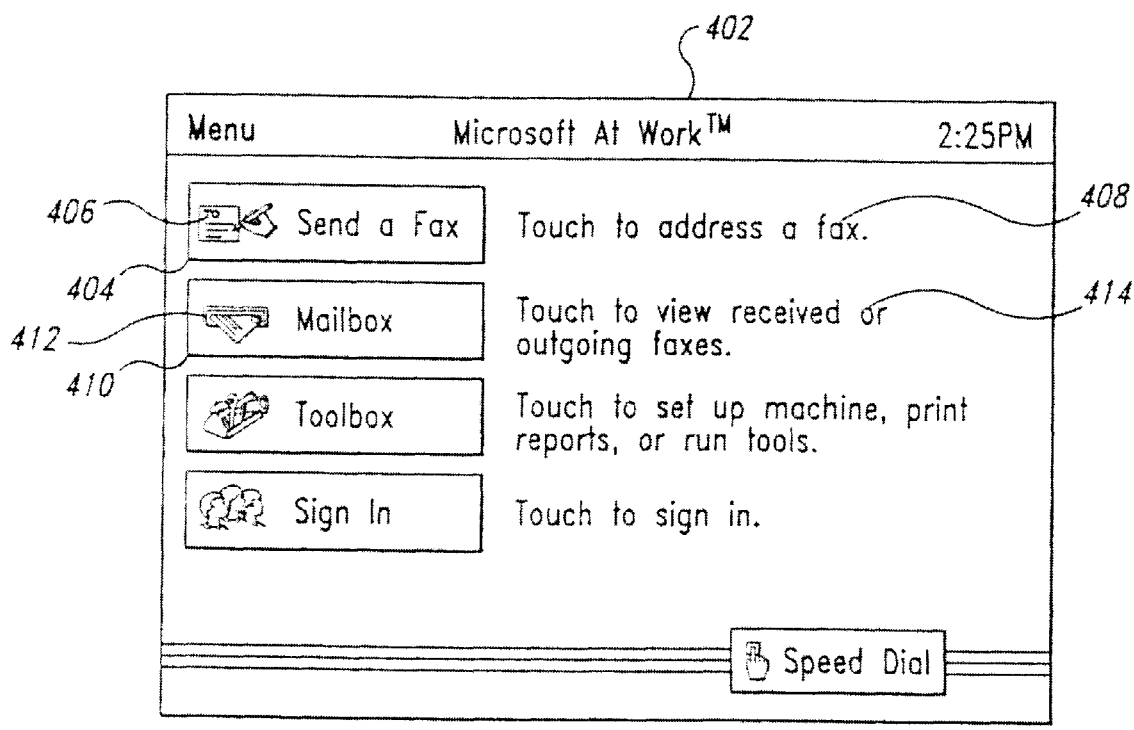
FIG. 4 illustrates a sample window displayed on a touch-sensitive screen in a preferred embodiment of the present invention.

FIG. 4 illustrates a sample window displayed on a touch-sensitive screen in a preferred embodiment of the present invention. The IVI system displays several objects on the touch-sensitive screen. One object is the status line 402. Other objects include a "Send a Fax" button 404, a "Send a Fax" icon 406, and a "Send a Fax" message area 408. An icon is a graphical symbol which may have associated text and which provides a visual cue to the user. For example, the "Send a Fax" icon provides a visual cue that the "Send a Fax" button will allow a user to send a fax. The "Send a Fax" button is a control. The "Send a Fax" button in FIG. 4 visually appears to be a three-dimensional button, however, it is displayed on a flat screen. A user selects a button by touching the button and then lifting their finger off the button. For example, a user selects the "Send a Fax" button by touching the "Send a Fax" button and then lifting their finger off the button. When a button is selected, the WI system performs the command associated with the button (e.g., send a facsimile).

A user may learn what objects are on the touch-sensitive screen by exploring. To explore the touch-sensitive screen, a user makes contact with the touch-sensitive screen, typically by touching the touch-sensitive screen with a finger, and then drags their finger over the touch-sensitive screen. The touch-sensitive screen may be viewed as a set of X,Y coordinates. The finger position corresponds to an X,Y coordinate on the touch-sensitive screen. As the user drags their finger over the touch-sensitive screen, the IVI system determines to what object the current coordinates correspond and then provides audio feedback to indicate what object the user is currently touching. For example, when a user drags their finger over a message area, the IVI system provides audio feedback by announcing the text in the message area. As the user drags the finger over an icon, the IVI system determines whether any text is associated with the icon. If text is associated with the icon, then the IVI system retrieves the text and announces the text. As the user drags their finger over a button, the IVI system announces the text displayed on the button on the touch-sensitive screen and announces that the user is touching a button. By dragging their finger over the entire touch-sensitive screen, a user may learn what is on the touch-sensitive screen.

If a user wishes to select a button, the user first makes contact with the button on the touch-sensitive screen by touching the button with their finger. Then, the user, without dragging their finger off of the button, lifts their finger off of the touch-sensitive screen (i.e., terminates contact with the touch-sensitive screen). When the IVI system detects that the user has lifted their finger off of the touch-sensitive screen, it selects the button and performs the command associated with the button. For instance, if a user wishes to send a facsimile, the user would select the "Send a Fax" button by dragging a finger to the "Send a Fax" button 404 and then lifting their finger off of the touch-sensitive screen. The IVI system would then send a facsimile.

Unlike prior systems which are based on a "capture" system of object selection, the IVI system is based on a "captureless" system. A "captureless" system allows a user to explore a touch-sensitive screen by dragging a finger over the touch-sensitive screen. A typical "capture" system receives mouse input. When a mouse button is pressed while the mouse pointer is over an object on a display screen, the "capture" system selects the object. If, while the mouse button is held down, the user drags the mouse pointer over another object, the "capture" system still has the original object selected. That is, other objects on the display screen are ignored in a "capture" system while an object is selected. If a "capture" system were used with a touch-sensitive screen, then when a user touched an object, the object would be selected. If a user then dragged their finger onto another object, this other object would be ignored. Therefore, a "capture" system would not allow a user to explore a touch-sensitive screen by dragging a finger over the touch-sensitive screen. Conversely, a preferred embodiment of the present invention uses a "captureless" system, and receives input from a touch-sensitive screen. In the IVI system, as a user drags their finger over a touch-sensitive screen, the IVI system announces each object that the finger touches.

In addition, a user selects controls in different manners in "capture" and "captureless" systems. A typical "capture" system receives mouse input. In a "capture" system, a user selects a control (e.g., a button) by pressing a mouse button while the mouse pointer is over the control, and then releasing the mouse button while the mouse pointer is still over the control (e.g, a click of the mouse button). However, in a "capture" system, if the user, after pressing the mouse button over a control, drags the mouse pointer over another control and then releases the mouse button, the "capture" system selects neither control. Additionally, with a conventional touch-sensitive screen, a user selects a control by touching the control. When a user selects a control, the command associated with the control is executed. Therefore, with a conventional touch-sensitive screen, if a user attempted to explore the conventional touch-sensitive screen by dragging a finger over the conventional touch-sensitive screen, the user may inadvertently execute a command. In a "captureless" system, a user selects a control by touching the control and then lifting a finger off the control. Therefore, if a user touches a control, then drags their finger over another control, and then lifts their finger off the other control, the user is selecting the other control.

To help prevent the inadvertent selecting of a control, the IVI system provides a predefined location on the display which contains no controls. A user may drag their finger to this location and lift their finger off of the touch-sensitive screen without selecting a control. In a preferred embodiment, this location is at the top, left corner of the touch-sensitive screen.

Figure 5:
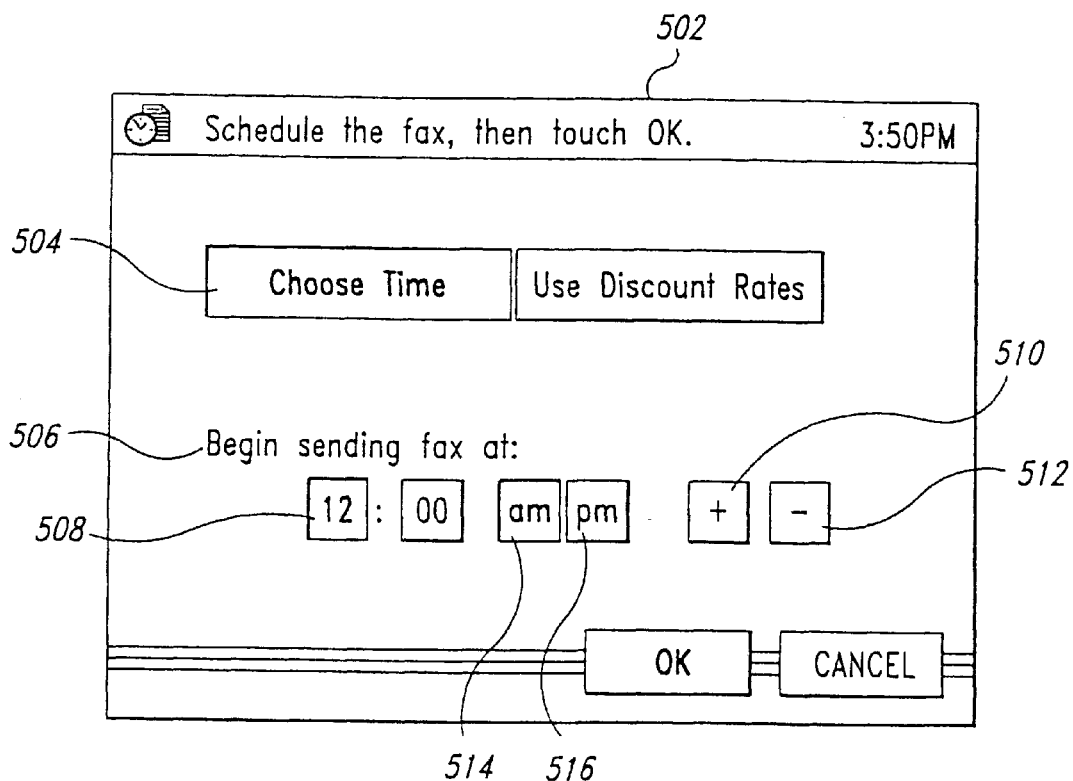
FIG. 5 illustrates a sample window that is displayed after a user has selected the "Send a Fax" button.

FIG. 5 illustrates a sample window that is displayed after a user has selected the "Send a Fax" button. The touch-sensitive screen includes a status line 502, which indicates that this touch-sensitive screen is used to schedule a facsimile. The "Choose Time" button 504 enables a user to schedule a particular time for the facsimile to be sent. Message area 506 contains the text "Begin Sending Fax At." This text is located over the text box containing the time the facsimile is to be sent. A text box is an object through which input data is received. The text box 508 can be changed by using the buttons 510 and 512. The message area 506 and the text box 508 inform the user of when the fax is scheduled to be sent. Also, the user may schedule the fax to be sent in the day or at night using the option buttons 514 and 516. Option buttons provide a means of exclusively selecting only one of several options. Selecting an option button deselects the previously selected option button.

For example, to change the time from 12:00 a.m. to 1:00 p.m., a user may explore the touch-sensitive screen by dragging a finger over the touch-sensitive screen until touching the "Choose Time" button. When the user touches the button, the IVI system announces the text on the button as well as announcing that the user is touching the button. The user selects the "Choose Time" button by touching it with a finger (e.g, by dragging a finger onto the button) and then, without dragging their finger off of the button, lifting their finger off of the touch-sensitive screen. The user then selects the text box 508 containing "12" by touching the text box and then, without dragging their finger off of the text box, lifting their finger off of the touch-sensitive screen. The IVI system announces the text in the text box when the user first touches the text box, and announces the text box has been selected when the user lifts their finger. A user selects the "+" button 510 by touching it with their finger and, without dragging their finger off of the button, lifting their finger off of the touch-sensitive screen. The IVI system announces that the "+" button is selected. When the "+" button is selected, the IVI system changes the text in the selected text box to "1" and may optionally announce the new time. A user then selects the "pm" option button 516. The IVI system announces that the "pm" option button has been selected. This would automatically deselect the "am" option button 516.

Figure 6:
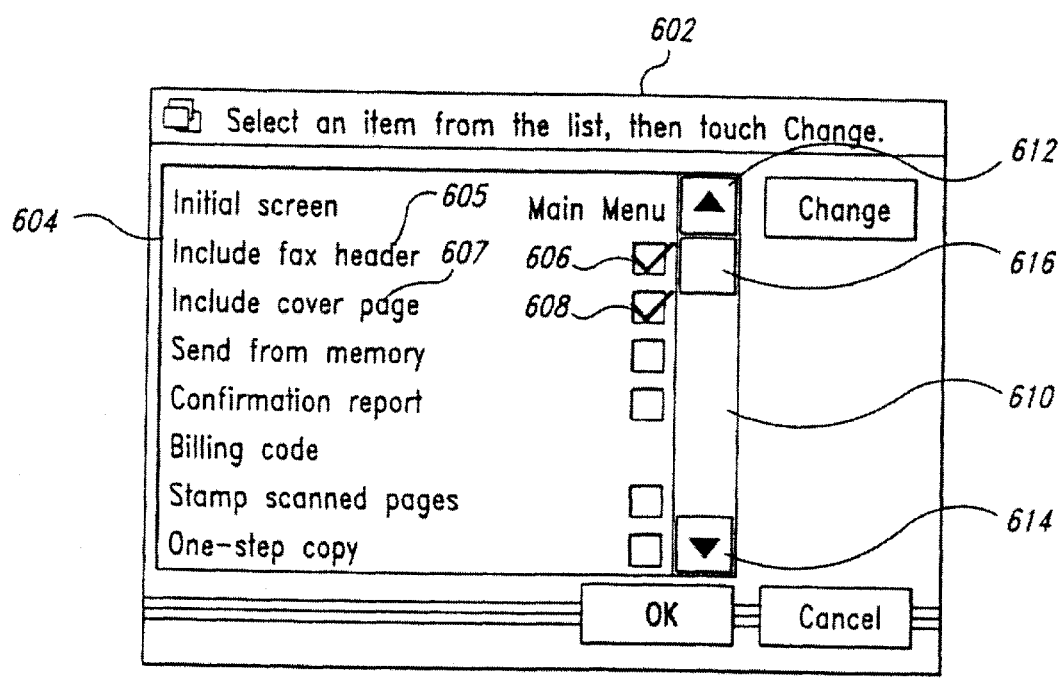
FIG. 6 illustrates a sample window displaying a list box containing check boxes in a preferred embodiment of the present invention.

FIG. 6 illustrates a sample window displaying a list box containing check boxes in a preferred embodiment of the present invention. The touch-sensitive screen contains a status line 602 instructing a user to select a list item and then touch the "Change" button. The list box 604 shows a portion of a list. The list box also includes check boxes 606 and 608. A check box is used to select one or more options from a set. When an option is selected, a check mark is typically shown to provide a visual cue that the option has been selected. The scroll bar 610 includes a scroll up arrow 612, a scroll down arrow 614, and a scroll thumb 616. A list box may either allow for selection of one list item at a time or may allow for selection of multiple list items.

While exploring, when the user touches the list box, the IVI system announces that the user has entered the list box. As the user touches a list item, the IVI system announces the text and announces that the user is touching a list item. If the list box allows multiple selection, the IVI system also announces whether the list item is selected. For example, if a user touches the list item containing the text "Include fax header," the IVI system announces this text and announces whether the list item is selected. To select a list item, the user touches the list item using a finger (e.g., by dragging a finger over the list item) and, without dragging their finger off the list item, lifts their finger off of the touch-sensitive screen. In this example, when a list item is selected, the corresponding check box is "checked" and the IVI system announces that the user has selected the list item. Also, in this example, multiple selections are allowed in the list box. For example, both the "Include fax header" list item 65 and the "Include cover page" list item 67 have been selected. When multiple selection is allowed, in order to deselect a list item, a user touches the selected list item with a finger and then lifts their finger off of the touch-sensitive screen. The IVI system announces the list item has been deselected. However, when single selection is allowed, a list item is deselected when another list item is selected and the IVI system does not announce the list item has been deselected.

A user may scroll through the list using the scroll bar. The scroll bar illustrated in FIG. 6 may also be implemented as a slider. When a user touches the scroll bar, the IVI system announces that the user is touching the scroll bar. To scroll up using a scroll up arrow, the user touches the scroll up arrow with their finger, and, without dragging their finger off of the scroll up arrow, lifts their finger off of the touch-sensitive screen. The IVI system then scrolls the list by one position and announces that the list has been scrolled by one position. The scroll down arrow is utilized in a similar manner.

The scroll thumb may also be used to scroll the list. To scroll the list using the scroll thumb, a user first touches the scroll thumb. The IVI system announces that the user has entered the scroll thumb. When touching the scroll thumb, the user lifts their finger off of the touch-sensitive screen without dragging their finger off of the scroll thumb to enter scroll mode. The IVI system then announces that the scroll mode has been entered. At this point, the user may scroll through the list by again touching the touch-sensitive screen and sliding the scroll thumb along the scroll bar. The user does not have to actually continue to touch the scroll thumb in order to slide it along the scroll bar. The user may slide their finger over any portion of the touch-sensitive screen, and the IVI system interprets the current finger position to correspond to a vertical position on the scroll bar, even if the finger is not on the scroll thumb. It is especially difficult for a visually impaired user to keep a finger on an object which is moving. For example, a visually impaired user may inadvertently drag their finger off of the scroll thumb or may drag their finger out of the scroll bar. In a conventional system, scrolling would stop if the finger were not touching the scroll thumb and sliding it through the scroll bar. The IVI system announces the number of lines scrolled as the user is scrolling. When the user then lifts their finger off of the touch-sensitive screen, the IVI system exits scroll mode. When the user again touches the touch-sensitive screen, the IVI system re-enters explore mode.

The IVI system further provides automatic announcements of window changes. For example, when a user changes from the window of FIG. 4 to the window of FIG. 5, the IVI system automatically determines the text associated with the status line of FIG. 5 and announces this text. The status line gives a short statement of the purpose of the current window, such as that the current window enables a user to schedule a fax (FIG. 5). In a preferred embodiment, the status line is the top, left-most object in the window. A window may also change independent of user input. For example, the window may change when the facsimile machine runs out of paper.

The IVI system also provides a summary mode, which announces a summary description of a window each time the window changes. The IVI system enters summary mode when a user inputs a predefined sequence of keys from an input device, such as a keypad. For example, the sequence of keys may be the keys representing "123." In summary mode, the IVI system first determines what types of objects are in the window. The IVI system also determines the locations of the objects, The IVI system then announces the type and location of the objects. For example, for the window illustrated in FIG. 4, a sample summary announcement may be: "There are four buttons on the left hand side with message areas directly to the right." To exit summary mode, a user inputs a predefined sequence of keys from a keypad. In addition, the IVI system provides a quick summary feature which announces a summary description of the current screen in response to a user entering a predefined sequence of keys from a keypad.

Figure 7:
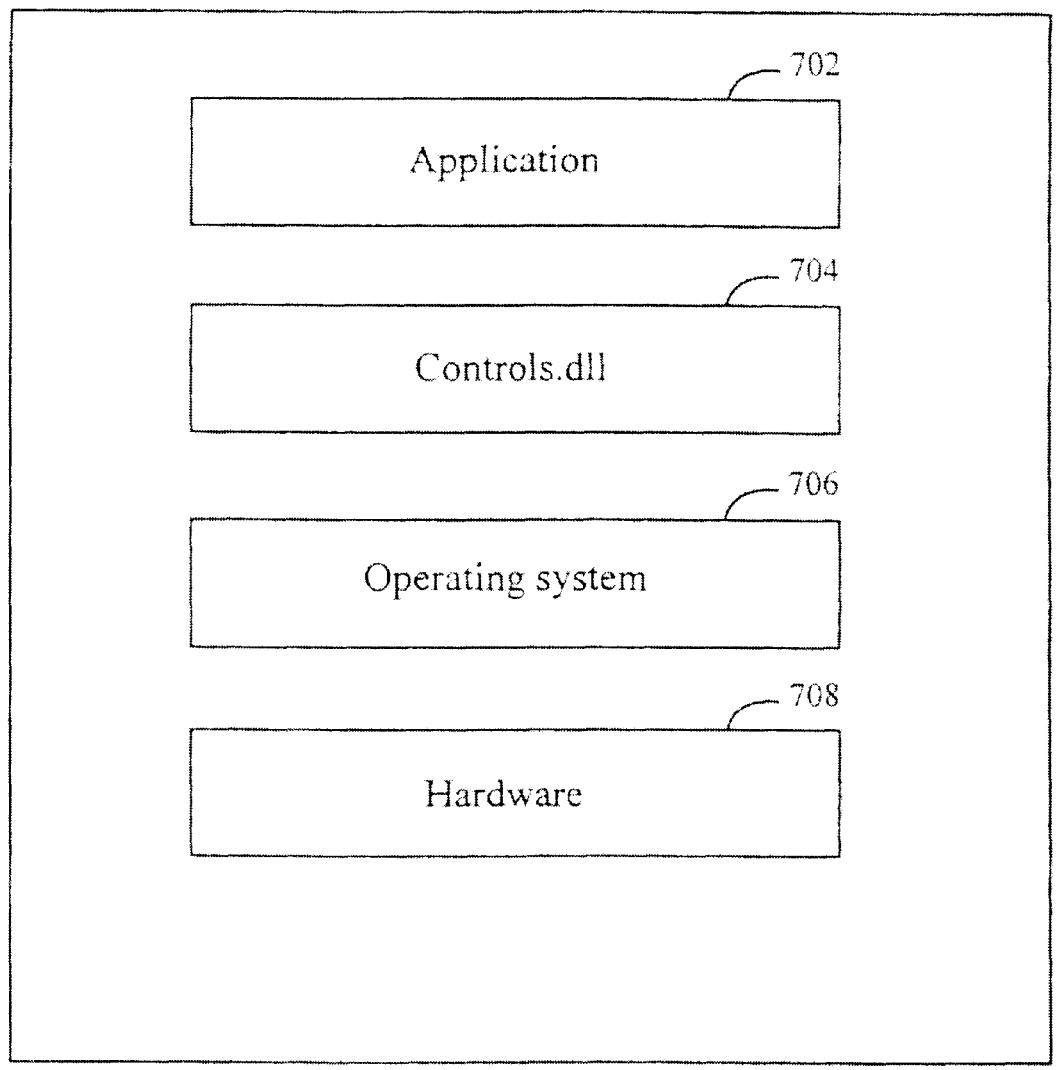
FIG. 7 illustrates an architecture in an implementation of a preferred embodiment of the present invention.

FIG. 7 illustrates an architecture of an implementation of a preferred embodiment of the present invention. The application 702 is the top level of the architecture. The application outputs the window to the touch-sensitive screen. The application also receives and processes user input from the touch-sensitive screen. The next level contains the "controls.dll" 704, which contains routines which implement functions of the IVI system, such as moving a scroll thumb through a scroll bar and announcing the status line text. An application which desires to use the IVI system calls functions within the controls.dll to perform functions associated with the user interface. The operating system 706 provides functions for the application. The lowest level of the system is the hardware 710. The hardware includes a communications port so that a user may connect a text-to-speech translator. This translates the text that is displayed on the touch-sensitive screen to speech which is announced. The text-to-speech translator may either announce words or announce characters.

Figure 8:
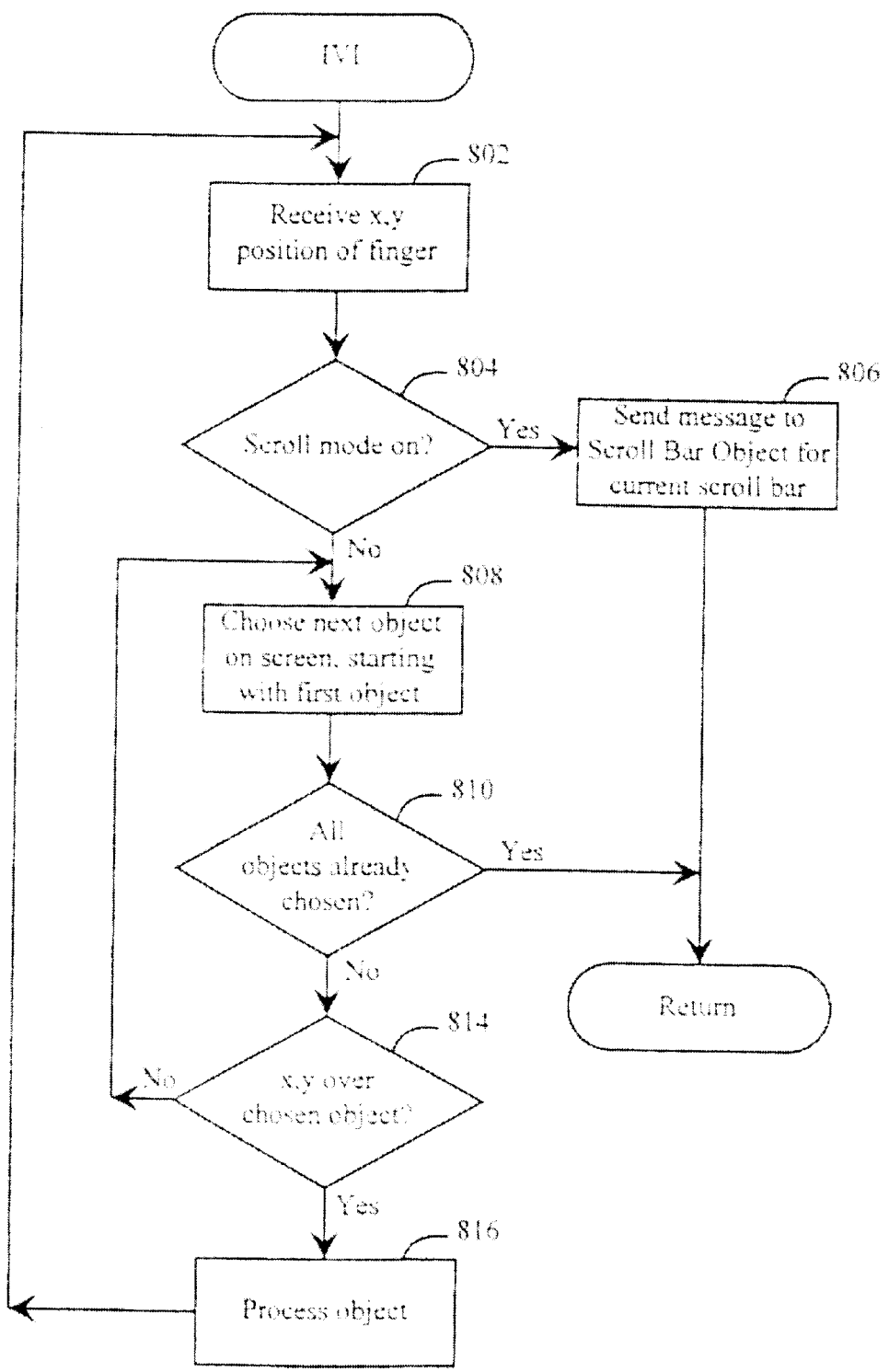
FIG. 8 shows an overview flow diagram of the interface for the visually impaired (IVI) system.

FIG. 8 shows an overview flow diagram of the interface for the visually impaired (IVI) system. The IVI system receives user input of the user's finger position on the touch-sensitive screen. The IVI system determines whether the user is currently in scroll mode or not. If the user is in scroll mode, then all messages received by the IVI system are sent to the scroll bar routine (windows procedure) which processes the messages for the scroll bar. Otherwise the IVI system determines what type of object the user is currently touching. Upon determining the type of object a user is touching, the WI system processes the object.

More specifically, in step 802, the IVI system receives the position of the user's finger on the touch-sensitive screen. In step 804, if the scroll mode is on, then the IVI system continues at step 806, otherwise the IVI system continues at step 808. When a user is initially using a touch-sensitive screen, scroll mode is off. In step 806, the IVI system sends messages to the scroll bar object routine for the current scroll bar. Since there may be a number of different scroll bars displayed on a single touch-sensitive screen, the IVI system determines which scroll bar is the current one and sends messages to the appropriate scroll bar object routine. In step 808, the IVI system chooses the next object on the touch-sensitive screen starting with the first object, and then continues at step 810. In step 810, if all objects have already been chosen, then the IVI system continues returns, otherwise the IVI system continues at step 814. In step 814, if the X,Y coordinate received is over the chosen object, then the IVI system continues at step 816, otherwise the IVI system loops back to step 808 and chooses the next object on the touch-sensitive screen. In step 816, the IVI system processes the chosen object and loops back to step 802 to receive more user input.

Figure 9:
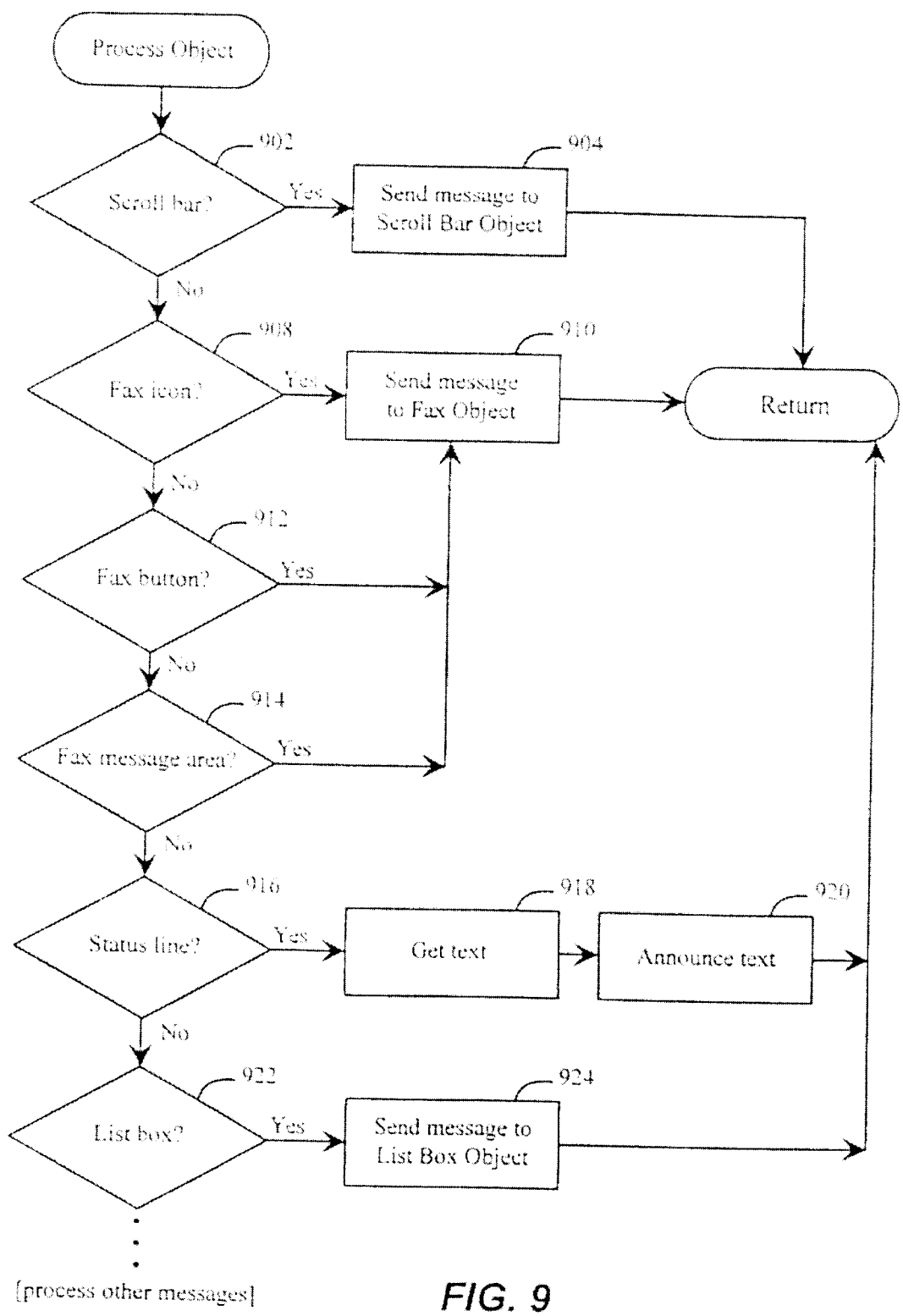
FIG. 9 shows a detailed flow diagram of the process object routine.

FIG. 9 shows a detailed flow diagram of the process object routine. The process object routine is passed the type of object that the user is touching and then determines how to process that object. In step 902, if the object is a scroll bar then the process object routine continues at step 904, otherwise the process object routine continues at step 908. In step 904, the process object routine sends a message to the scroll bar object routine and returns. In step 908, if the object is a fax icon, then the process object routine continues at step 910, otherwise the process object routine continues at step 912. In step 910, the process object routine sends a message to the fax object routine and returns. In step 912, if the object is a fax button, then the process object routine continues at step 910, otherwise the process object routine continues at step 914. In step 914, if the object is a fax message area, then the process object routine continues at step 910, otherwise the process object routine continues at step 916. In step 916, if the object is a status line object, then the process object routine continues at step 918, otherwise the process object routine continues at step 922. In step 918, the process object routine retrieves text associated with the status line. In step 920, the process object routine announces the retrieved text and returns. In step 922, if the object is a list box object, then the process object routine continues at step 924, otherwise the process object routine continues to process other types of objects in a similar manner, as indicated by the ellipses in FIG. 9. In step 924, the process object routine sends a message to the list box object routine, and returns.

Figure 10:
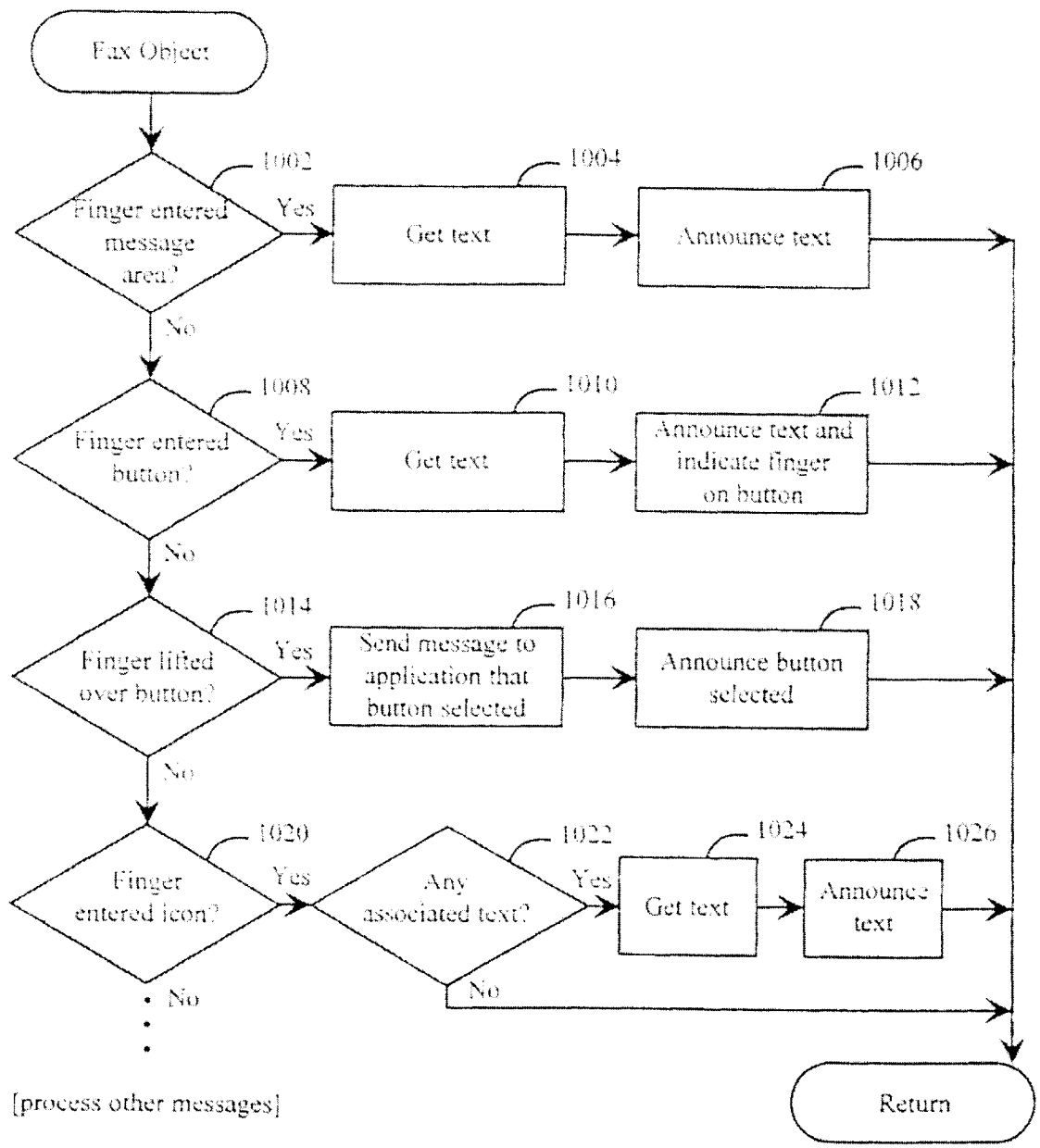
FIG. 10 shows a detailed flow diagram of the fax object routine.

FIG. 10 shows a detailed flow diagram of the fax object routine. The fax object routine handles all of the messages received that deal with an object associated with the fax. For example, as discussed above, there is a fax message area, a fax button, and a fax icon. The fax object routine will process the messages received for these various objects. In particular, in step 1002, if the finger has entered the message area, then the fax object routine continues at step 1004, otherwise the fax object routine continues at step 1008. The finger enters an object when the last position of the finger was not on the object and the current position of the finger is on that object. In step 1004, the fax object routine retrieves text associated with the message area. In step 1006, the fax object routine announces the retrieved text and returns. In step 1008, if the finger has entered the button, the fax object routine continues at step 1010, otherwise the fax object routine continues at step 1014. In step 1010, the fax object routine retrieves text associated with the button. In step 1012, the fax object routine announces the retrieved text and announces the user has entered a button, and then returns. In step 1014, if the finger is lifted over a button, then the fax object routine continues at step 1016, otherwise the fax object routine continues at step 1020. In step 1016, the fax object routine sends a message to the application that the button has been selected. The application then executes the command associated with the button. In step 1018, the fax object routine announces that the button has been selected and then returns. In step 1020, if the finger has entered an icon, then the fax object routine continues to step 1022, otherwise the fax object routine continues to process other messages as indicated by the ellipses indicated in FIG. 10. In step 1022, if there is any text associated with the icon, then the fax object routine continues at step 1024, otherwise the fax object routine returns. In step 1024, the fax object routine retrieves text associated with the icon. In step 1026, the fax object routine announces the text and then returns.

Figure 11:
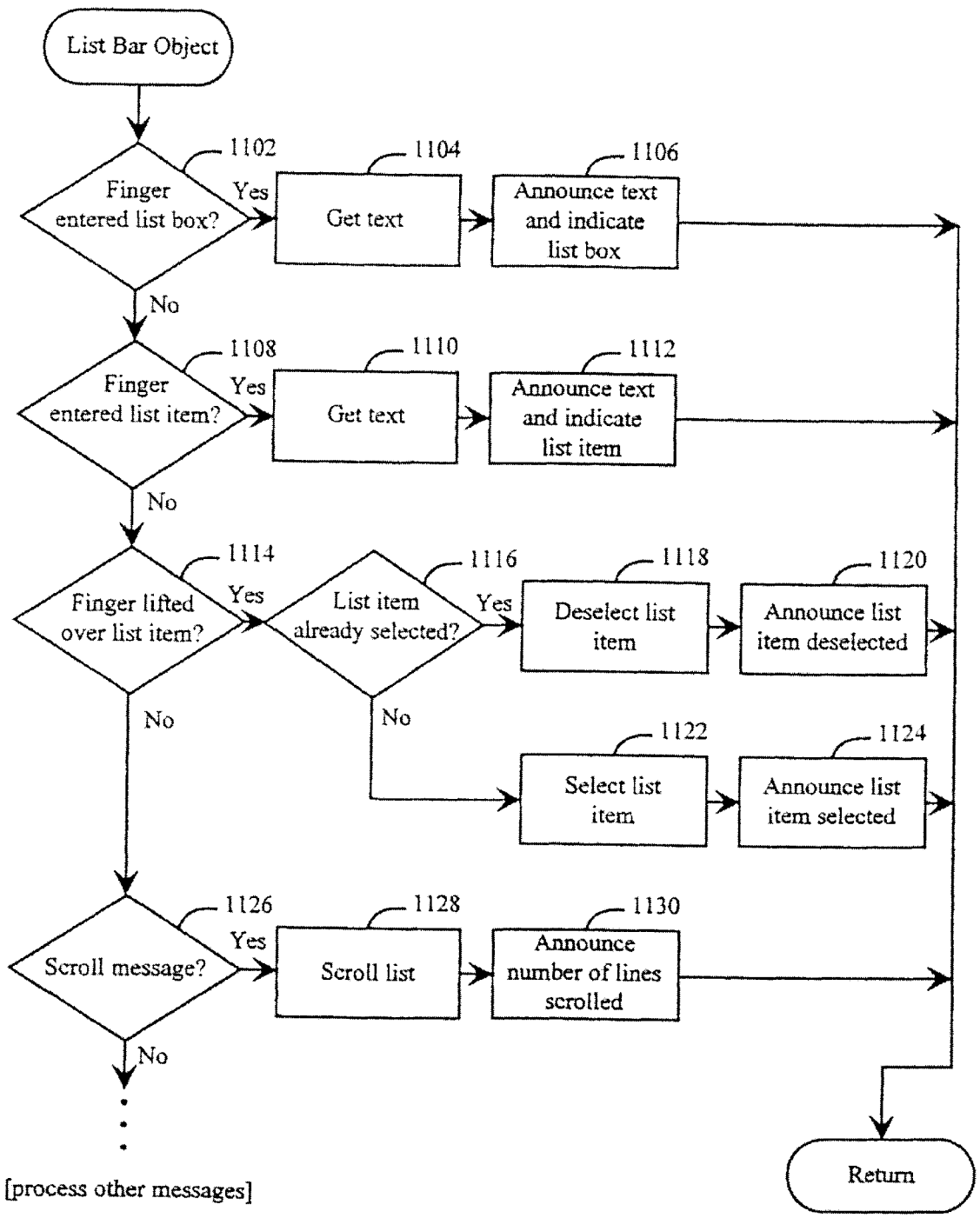
FIG. 11 shows a detailed flow diagram of the list box object routine for a list box which allows multiple selection.

FIG. 11 shows a detailed flow diagram of the list box object routine for a list box which allows multiple selection. The list box object routine processes objects associated with the list box. In step 1102, if the finger has entered the list box, then the list box object routine continues at step 1104, otherwise the list box object routine continues at step 1108. In step 1104, the list box object routine retrieves text associated with the list box. In step 1106, the list box object routine announces the retrieved text and that the finger has entered the list box, and then returns. In step 1108, if the finger has entered a list item, then the list box object routine continues at step 1110, otherwise the list box object routine continues at step 1114. In step 1110, the list box object routine retrieves text associated with the list item. In step 1112, the list box object routine announces the retrieved text and announces that the user has entered a list item, and then returns. In step 1114, if the finger is lifted over a list item, then the list box object routine continues at step 1116, otherwise the list box object routine continues at step 1126. In step 1116, if the list item has already been selected, then the list box object routine continues at step 1118, otherwise the list box object routine continues at step 1122. In step 1118, the list box object deselects the list item. In step 1120, the list box object routine announces that the list item has been deselected and returns. In step 1122, the list box object routine selects the list item. In step 1124, the list box object routine announces the list item has been selected and returns. In step 1126, if there is a scroll message, then the list box object routine continues at step 1128, otherwise the list box object routine continues to process other messages as indicated by the ellipses in FIG. 11. In step 1128, the list box object routine scrolls the list. In step 1130, the list box object routine announces the number of lines scrolled, and then returns.

Figure 12:
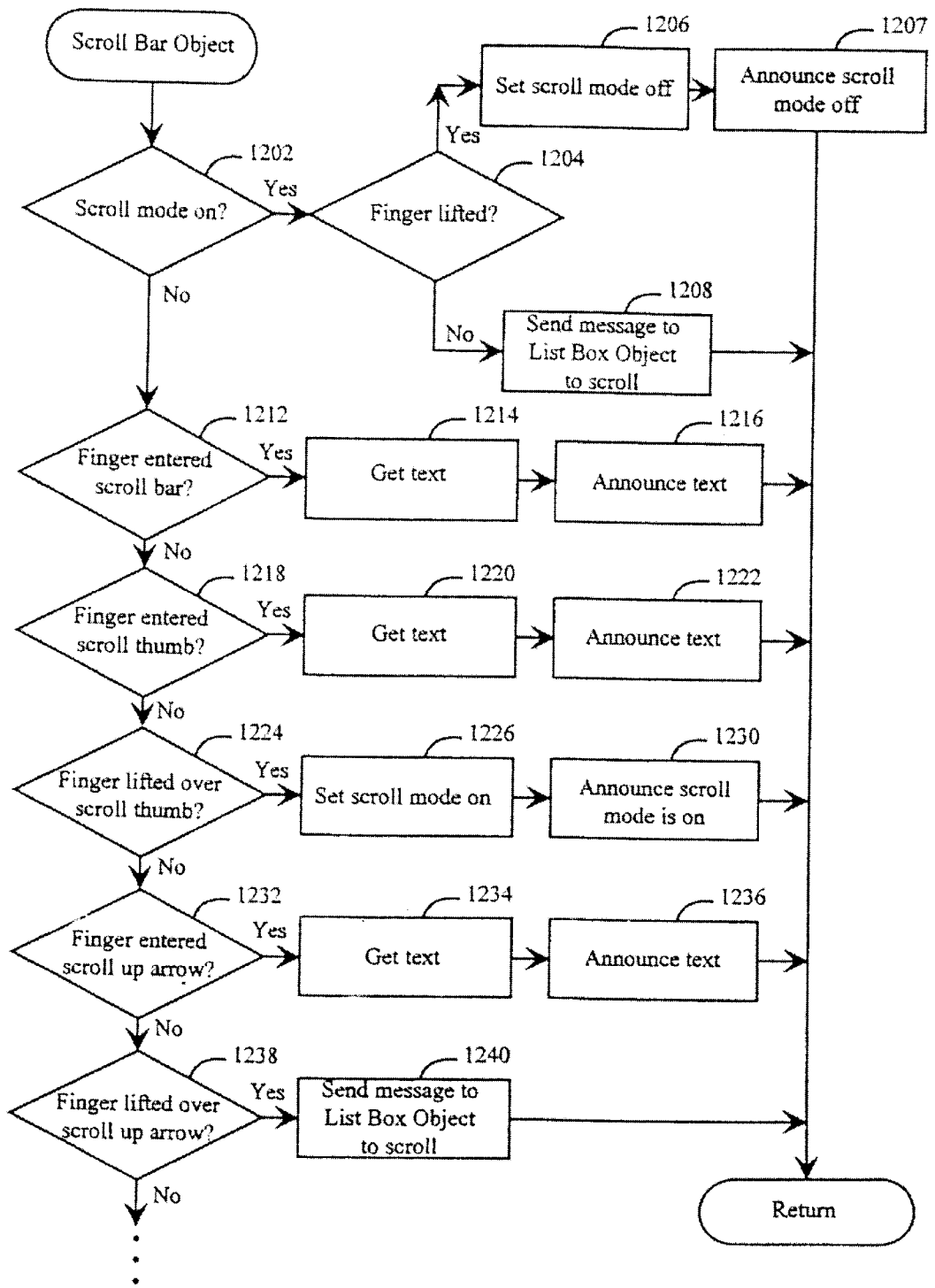
FIG. 12 shows a detailed flow diagram of the scroll bar object routine.

FIG. 12 shows a detailed flow diagram of the scroll bar object routine. The scroll bar object routine processes all objects associated with the scroll bar. hi step 1202, if scroll mode is on, then the scroll bar object routine continues at step 1204, otherwise the scroll bar object routine continues at step 1212. In step 1204, if the finger is lifted, then the scroll bar object routine continues at step 1206, otherwise the scroll bar object routine continues at step 1208. In step 1206, the scroll bar object routine sets the scroll mode off. In step 1207, the scroll bar object routine announces that scroll mode is off and returns. In step 1208, the scroll bar object routine sends a message to the list box object routine to scroll and returns. In step 1212, if the finger has entered the scroll bar, the scroll bar object routine continues at step 1214, otherwise the scroll bar object routine continues at step 1218. In step 1214, the scroll bar object routine retrieves text associated with the scroll bar. In step 1216, the scroll bar object routine announces the retrieved text and returns. In step 1218, if the finger has entered the scroll thumb, the scroll bar object routine continues at step 1220, otherwise the scroll bar object routine continues at step 1224. In step 1220, the scroll bar object routine retrieves text associated with the scroll thumb. In step 1222, the scroll bar object routine announces the retrieved text and returns. In step 1224, if the finger is lifted over the scroll thumb, then the scroll bar object routine continues at step 1226, otherwise the scroll bar object routine continues at step 1232. The finger is lifted over an object when the last position of the finger was on that object and the current position of the finger is currently lifted off of the touch-sensitive screen. In step 1226, the scroll bar object routine sets the scroll mode on. In step 1230, the scroll bar object routine announces that scroll mode is on and returns. In step 1232, If the finger has entered the scroll up arrow, then the scroll bar object routine continues at step 1234, otherwise the scroll bar object routine continues at step 1238. In step 1234, the scroll bar object routine retrieves text associated with the scroll up arrow. In step 1236, the scroll bar object routine announces the retrieved text and returns. In step 1238, if the finger is lifter over the scroll up arrow, then the scroll bar object routine continues at step 1240, otherwise the scroll bar object routine processes other messages as indicated by the ellipses in FIG. 12. In step 1240, the scroll bar object routine sends a message to the list box object routine to scroll the list, and then returns.

In an alternate embodiment, each office machine need not have a touch-sensitive screen or text-to-speech translator. Rather, the office machine would have an interface that communicates using an electromagnetic signal (e.g., infrared) with a portable IVI I/O unit that is carried by the visually impaired user. The IVI I/O unit has a touch-sensitive screen, a text-to-speech translator, and an electromagnetic communications interface. When an IVI I/O unit is in close proximity to an office machine, the unit receives information from the office machine to control the inputting and outputting of data. The IVI I/O unit could either have control instructions downloaded from the office machine or could store control instructions in its memory and use a transmitted machine identifier to select the control instructions to use.

Although the present invention has been described in terms of the preferred embodiment, it is not intended that the invention be limited to this embodiment. Although the IVI system has been described in terms of visual display, the use of a visual display is not necessary for the visually impaired. For example, neither text nor graphical symbols can be seen by visually impaired users who have lost all vision, and these are typically not seen clearly by visually impaired users who have limited vision, and so it is not necessary to actually display these. Instead of using a touch-sensitive screen, the present invention can be used with a touch-sensitive panel which has no associated display device. The various regions (e.g., button) are defined on the touch-sensitive panel without displaying any indication of where the regions are positioned. Also, summary mode may be entered by executing a control rather than by entering a key sequence. Moreover, a control may be executed by touching an "activate" control rather than by touching a control and lifting the finger off of the touch-sensitive screen. Modification within the spirit of the invention will be apparent to those skilled in the art. The scope of the present invention is defined by the claims which follow.

What is claimed is:

1. A method in a computer system for selecting a control region of a touch-sensitive panel from among a plurality of control regions that are touch-sensitive and a plurality of non-control regions that are touch-sensitive the control regions and non-control regions arranged in at least a two dimensional arrangement on the touch-sensitive panel with two control regions separated by a non-control region, the method comprising the steps of:

determining whether a user is contacting the touch-sensitive panel over a first control region; and when the user has contacted the touch-sensitive panel over the first control region, determining whether the user has terminated contact with the first control region;

when the user has terminated contact with the first control region by releasing contact from the touch-sensitive panel over the first control region, selecting the first control region; and when the user has terminated contact with the first control region by contacting the touch-sensitive panel over a non-control region, without selecting the first control region, waiting for the user to contact the touch-sensitive panel over a second control region; and when the user has contacted the touch-sensitive panel over the second control region, determining whether the user has terminated contact with the second control region, and when the user has terminated contact with the second control region by releasing contact from the touch-sensitive panel over the second control region, selecting the second control region.

2. The method of claim 1 wherein the touch-sensitive panel is a touch-sensitive screen and including the step of displaying an indication of each of the control regions on the touch-sensitive screen.

3. The method of claim 1 including, when the user first contacts the touch-sensitive panel over a control region, providing audio feedback indicating the user has entered the control region.

4. The method of claim 1 wherein each of the control regions has an associated function, and including the steps of executing the function associated with the selected one of the control regions and providing audio feedback indicating execution of the function associated with the selected one of the control regions.

5. The method of claim 1 wherein the user contacts the touch-sensitive panel by touching a finger on the panel and releases contact from the touch-sensitive panel by lifting the finger from the panel.

6. A method in a computer system for controlling a scroll bar, the computer system having a touch-sensitive panel with a scroll bar region, the scroll bar region having a scroll box sub-region, the method comprising the steps of:

determining whether the user is contacting the touch-sensitive panel over the scroll box sub-region;

when the user is contacting the touch-sensitive panel over the scroll box sub-region,
setting a first position of contact for the scroll box sub-region;
determining whether the user terminates contact with the touch-sensitive panel without contacting the touch-sensitive panel outside of the scroll box sub-region; and
when the user terminates contact with the touch-sensitive panel in such a way, setting a scroll mode to on; and while the scroll mode is on,
determining whether the user has contacted the touch-sensitive panel and determining a second position of contact; and
calculating an amount to scroll based on a difference between the first and the second position of contact.

7. The method of claim 6 wherein the touch-sensitive panel is a touch-sensitive screen and including the step of displaying an indication of the scroll bar region on the touch-sensitive screen.

8. The method of claim 6 including, when the user first contacts the scroll bar region, providing audio feedback indicating the user has entered the scroll bar region.

9. The method of claim 6 including, when the user first contacts the scroll box sub-region, providing audio feedback indicating the user has entered the scroll box sub-region.

10. The method of claim 6 including, when setting the scroll mode to on, providing audio feedback indicating that scroll mode is on.

11. The method of claim 6 wherein the scroll bar controls the scrolling of a list of list items and including the step of scrolling the list based on the calculated amount to scroll.

12. The method of claim 11 wherein the step of scrolling the list includes the step of providing audio feedback indicating a number of list items that are scrolled.

13. The method of claim 6 wherein the user contacts the touch-sensitive panel by touching a finger on the panel.

14. A computer-readable memory medium containing instructions for controlling a computer processor in a computer system to select a control region of a touch-sensitive panel from among a plurality of control regions that are touch-sensitive and a plurality of non-control regions that are touch-sensitive, the control regions and non-control regions arranged in at least a two dimensional arrangement on the touch-sensitive panel with at least two control regions separated by a non-control region, by performing the steps of:

determining whether a user is touching the touch-sensitive panel on a first control region; and when the user is touching the touch-sensitive panel on the first control regions
determining whether the user has terminated touching the first control region;
when the user has terminated touching the first control region by releasing contact from the touch-sensitive panel over the first control region, selecting the first control region; and
when the user has terminated touching the first control region by is moving contact such that the user is touching the touch-sensitive panel over a non-control region,
without selecting the fist control region, waiting for the user to touch the touch-sensitive panel over a second control region; and
when the user is touching the touch-sensitive panel over the second control region, determining whether the user has terminated touching the second control region, and when the user has terminated touching the second control region by releasing contact from the touch-sensitive panel over the second control region, selecting the second control region.

15. The computer-readable memory medium of claim 14 wherein the touch-sensitive panel is a touch-sensitive screen and including the step of displaying an indication of each of the control regions on the touch-sensitive screen.

16. The computer-readable memory medium of claim 14, including when the user first contacts the touch-sensitive panel over a control region, providing audio feedback indicating the user has entered the control region.

17. The computer-readable memory medium of claim 14 wherein each of the control regions has an associated function, and including the steps of executing the function associated with the selected one of the control regions and providing audio feedback indicating execution of the function associated with the selected one of the control regions.

18. The computer-readable memory medium of claim 14 wherein the user touches the touch-sensitive panel by touching a finger on the panel and releases contact from the touch-sensitive panel by lifting the finger from the panel.

19. A computer-readable memory medium containing instructions for controlling a computer processor in a computer system to control a scroll bar, the computer system having a touch-sensitive panel with a scroll bar region, the scroll bar region having a scroll box sub-region, by performing the steps of:

determining whether the user is contacting the touch-sensitive panel over the scroll box sub-region;

when the user is contacting the touch-sensitive panel over the scroll box sub-region,
setting a first position of contact for the scroll box sub-region;
determining whether the user terminates contact with the touch-sensitive panel without contacting the touch-sensitive panel outside of the scroll box sub-region; and
when the user terminates contact with the touch-sensitive panel in such a way, setting a scroll mode to on; and while the scroll mode is on,
   determining whether the user has contacted the touch-sensitive panel and determining a second position of contact; and
   calculating an amount to scroll based on a difference between the first and the second position of contact.

20. The computer-readable memory medium of claim 19 wherein the touch-sensitive panel is a touch-sensitive screen and including the step of displaying an indication of the scroll bar region on the touch-sensitive screen.

21. The computer-readable memory medium of claim 19 including, when the user first contacts the scroll bar region, providing audio feedback indicating the user has entered the scroll bar region.

22. The computer-readable memory medium of claim 19 including, when the user first contacts the scroll box sub-region, providing audio feedback indicating the user has entered the scroll box sub-region.

23. The computer-readable memory medium of claim 19 including, when setting the scroll mode to on, providing audio feedback indicating that scroll mode is on.

24. The computer-readable memory medium of claim 19 wherein the scroll bar controls the scrolling of a list of list items and including the step of scrolling the list based on the calculated amount to scroll.

25. The computer-readable memory medium of claim 19 wherein the step of scrolling the list includes the step of providing audio feedback indicating a number of list items that are scrolled.

26. The computer-readable memory medium of claim 19 wherein the user contacts the touch-sensitive panel by touching a finger on the panel.

* * * * *

UNITED STATES PATENT AND TRADEMARK OFFICE
CERTIFICATE OF CORRECTION

PATENT NO. : 6,496,182 B1
DATED : December 17, 2002
INVENTOR(S) : P.K.-H. Wong et al.

It is certified that error appears in the above-identified patent and that said Letters Patent is hereby corrected as shown below:

<u>Title page,</u>
Item [56], References Cited, U.S. PATENT DOCUMENTS,"Smmith et al." should read -- Smith et al. --

<u>Column 5,</u>
Line 33, "WI" should read -- IVI --

<u>Column 7,</u>
Line 18, " "12" " should read -- "12" --

<u>Column 9</u>
Line 35, "WI" should read -- IVI --

<u>Column 12,</u>
Line 39, "that are touch sensitive" should read -- that are touch-sensitive, --

<u>Column 14,</u>
Line 9, "first control regions" should read -- first control --
Line 17, "by is moving" should read -- by moving --
Line 64, "region; and" should read -- region; --

<u>Column 16,</u>
Line 9, "claim 19" should read -- claim 24 --

Signed and Sealed this

Twenty-second Day of July, 2003

JAMES E. ROGAN
*Director of the United States Patent and Trademark Office*